(12) United States Patent
Alpert et al.

(10) Patent No.: US 8,837,733 B2
(45) Date of Patent: Sep. 16, 2014

(54) SYSTEM FOR PROTECTION AND AUTHENTICATION OF LOCATION SERVICES WITH DISTRIBUTED SECURITY

(75) Inventors: Yaron Alpert, Hod Hasharoni (IL); Gil Zukerman, Hod-HaSharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/610,441

(22) Filed: Sep. 11, 2012

(65) Prior Publication Data

US 2013/0311764 A1    Nov. 21, 2013

Related U.S. Application Data

(60) Provisional application No. 61/648,003, filed on May 16, 2012.

(51) Int. Cl.
*H04L 9/12* (2006.01)
*H04L 29/06* (2006.01)
*H04L 9/08* (2006.01)

(52) U.S. Cl.
CPC .............. *H04L 9/0816* (2013.01); *H04L 63/00* (2013.01)
USPC ....................................................... 380/270

(58) Field of Classification Search
None
See application file for complete search history.

(56) References Cited

U.S. PATENT DOCUMENTS

| 2008/0080712 A1 | 4/2008 | Huang et al. |
| 2008/0182592 A1 | 7/2008 | Cha et al. |
| 2008/0232586 A1 | 9/2008 | Takada et al. |
| 2010/0205316 A1 | 8/2010 | Xue et al. |

FOREIGN PATENT DOCUMENTS

| JP | 2001-320760 A | 11/2001 |
| WO | 2013/173215 A1 | 11/2013 |

OTHER PUBLICATIONS

An Embedded Platform for Privacy-Friendly Road Charging Applications. Balasch et al. EDAA(2010).*
Selective Location Blinding Using Hash Chain. Lenzini et al. Springer-Verlag Berlin Heidelberg 2011.*
International Search Report and Written Opinion received for PCT Patent Application No. PCT/US2013/040732, mailed on Oct. 18, 2013, 12 pages.

* cited by examiner

*Primary Examiner* — Venkat Perungavoor
(74) *Attorney, Agent, or Firm* — Grossman, Tucker, Perreault & Pfleger, PLLC

(57) ABSTRACT

Generally, this disclosure provides methods and apparatus for the protection and authentication of location services based on a distributed security system. The method may include exchanging security keys between a secure location processor (SLP) and a location requesting entity, the location requesting entity external to the SLP; obtaining location determination measurements, the obtaining performed by the SLP; determining a location based on the location determination measurements, the determining performed by the SLP; encrypting the location based on the security keys, the encrypting performed by the SLP; and transmitting the encrypted location from the SLP to the location requesting entity.

19 Claims, 6 Drawing Sheets

SYSTEM FOR PROTECTION AND AUTHENTICATION OF LOCATION SERVICES WITH DISTRIBUTED SECURITY

CROSS-REFERENCE TO RELATED APPLICATIONS

This application claims the benefit of U.S. Provisional Application No. 61/648,003 filed May 16, 2012, which is incorporated by reference herein in its entirety.

FIELD

The present disclosure relates to protection and authentication of location services, and more particularly, to protection and authentication of location services with a distributed security system.

BACKGROUND

Mobile devices, such as, for example, smartphones, often have location determination capabilities. These capabilities may be based on global positioning system (GPS) technology or other methods. It is sometimes useful for the determined location to be passed to an application running on the device or for the location to be passed over a wireless network connection to a remote server so that the location may be used to provide services or other enhanced features to the user of the mobile device. In some instances, for example, mapping or navigational services may be provided to the user. As another example, listings of nearby restaurants or stores may be provided. As yet another example, location information may be provided to emergency responders.

Security and privacy concerns are of growing importance, however, and users of mobile devices may not want their location to be made available to unauthorized entities. Typically, an encryption based secure channel is established over the wireless network between the operating system (or an application) running on the mobile device and the remote server. This method is vulnerable, however, to a type of attack known as a "man-in-the-middle" attack, where a malicious application may gain control of the device and obtain access to the location information before it is encrypted. The malicious application may then redirect the location information to unauthorized entities (sometimes referred to as snooping) or may modify the location information prior to transmission to the intended destination (sometimes referred to as spoofing). In some cases, the modified (or counterfeit) location may be used to circumvent restrictions related to position.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
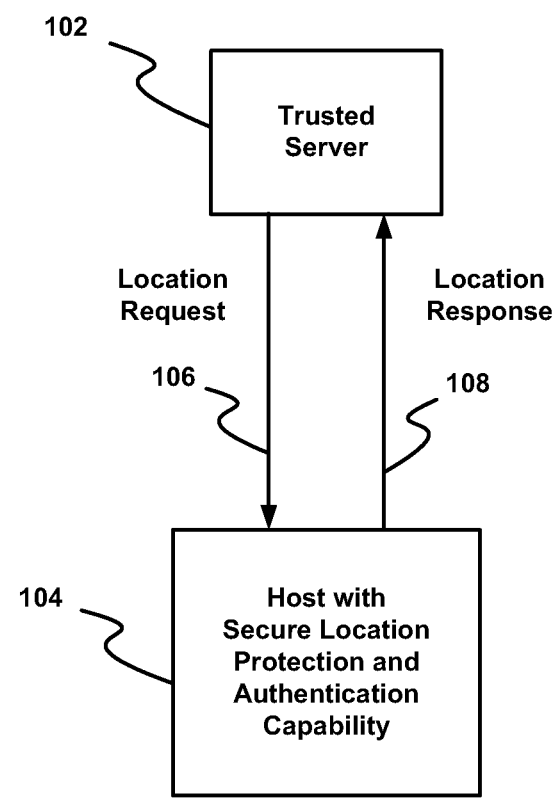
FIG. 1 illustrates a top level system diagram of one exemplary embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides methods and apparatus for the protection and authentication of location services based on a distributed security system. A secure location processor (SLP) comprising a trusted execution environment (TEE) may generate location information, or measurement information from which locations may be calculated, and encrypt or otherwise secure that information. The SLP may be part of a host platform such as a mobile device with self location capability. The SLP may perform the encryption based on an exchange of security keys with a trusted application or server, e.g., receiving a security key from a trusted application and sending a security key to the trusted application. Since the information is secured before leaving the SLP, it may be protected from both unauthorized access and tampering while it is transmitted to or through the operating system (OS) or other application software running on a host platform. Trusted applications or servers that legitimately receive the encrypted location information may benefit from an increased level of assurance that the provided location information is authentic, while malicious applications may be prevented from decoding or modifying the information.

The term access point (AP) as used herein, is defined as any entity that has station (STA) functionality and provides access to the distribution services, via the wireless medium (WM) for associated STAs.

The term Personal basic service set Control Point (PCP) as used herein, is defined as a STA that operates as a control point of the mm-wave network.

The term wireless network controller as used herein, is defined as a station that operates as a PCP and/or as an AP of the wireless network.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a smartphone, a digital television, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HDTM and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards for Worldwide Interoperability for Microwave Access (WiMAX), Third Generation Partnership Project (3GPP) including Long Term Evolution (LTE) and Long Term Evolution Advanced (LTE-A), and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, Wireless Metropolitan Area Networks (WMAN), Wireless Wide Area Networks (WWAN), ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

FIG. 1 illustrates a top level system diagram 100 of one exemplary embodiment consistent with the present disclosure. A trusted server 102 may send a location request 106 to a host 104 having secure location protection and authentication capability, as will be explained in greater detail below. The host 104 may then reply with a secured location response 108. In some embodiments the host 104 may be a mobile platform such as, for example, a mobile communication device or smartphone with self location determination capability. The trusted server 102 may be a remote system configured to provide services or features to the user of the host 104 based on the location information provided. The location response may be secured in a way that prevents unauthorized entities from accessing (sometimes referred to as snooping) or altering (sometimes referred to as spoofing) the information. In some embodiments, the trusted server 102 may be a trusted application that may be server based or client based and may be local or remote with respect to the host 104. A trusted server or trusted application may be an entity possessing authorization to obtain secured location information and may possess credentials to indicate that authorization.

Figure 2:
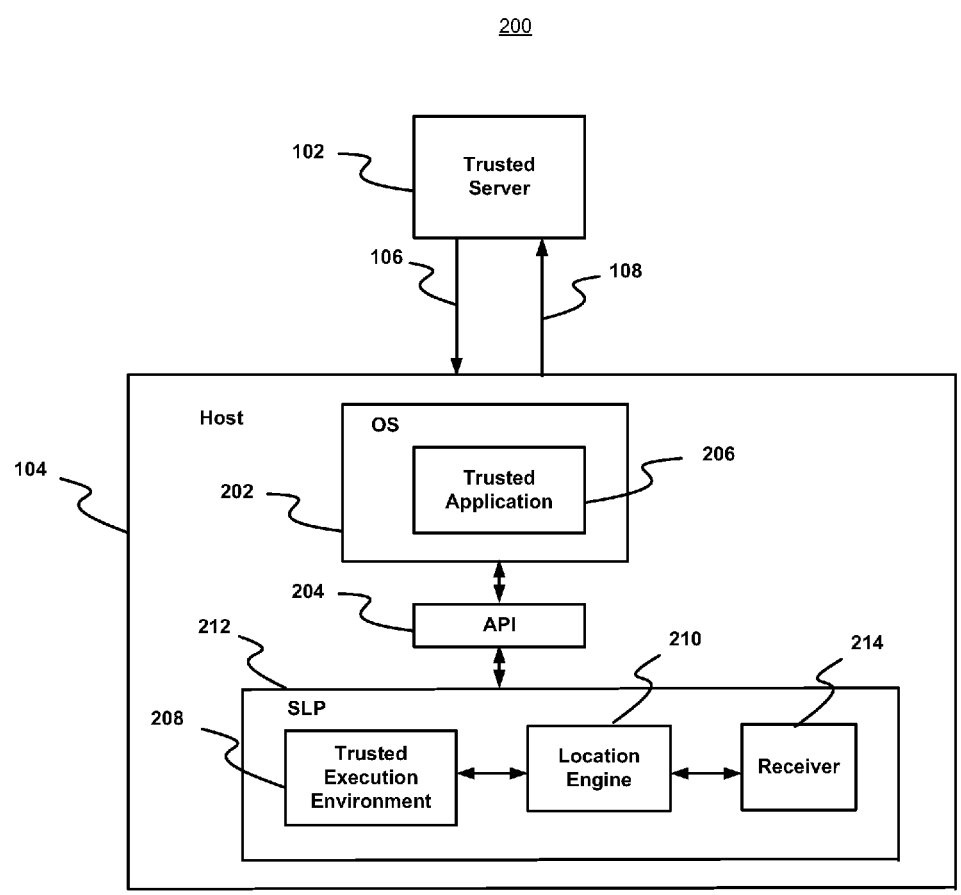
FIG. 2 illustrates a block diagram of one exemplary embodiment consistent with the present disclosure.

FIG. 2 illustrates a block diagram 200 of one exemplary embodiment consistent with the present disclosure. The host 104, in this embodiment, is shown to comprise an Operating System (OS) 202 which may support the execution of one or more applications which may include trusted applications 206. The host 104 also includes a secured location processor (SLP) 212, the operation of which will be explained in greater detail below. The SLP 212 may include a trusted execution environment (TEE) 208, a location engine 210 and a receiver 214. The SLP 212 may communicate securely with other parts of the host 104 through an application programming interface (API) 204 that provides standardized message formats for requests and responses. The API 204 may be a physical interface or a logical interface and may not be made visible to non-trusted entities. In some embodiments, the SLP 212 may be visible only to trusted applications 206.

The receiver 214 may be configured to receive location determination measurements, i.e., measurement information of any type that may enable the calculation or determination of the location of the host 104 platform. The location determination measurements may be received wirelessly, for example as radio frequency (RF) communications, from an external source. The external source may, for example, be GPS satellites and the location determination measurements may be timing information from which a location may be calculated. Alternatively, or in combination, the external source may be one or more WiFi access points (APs) that provide relative distance information. Alternatively, or in combination, the external source may be a motion sensor or a proximity sensor and may communicate using Bluetooth or any other suitable wireless communication techniques.

The location engine 210 may be a module, circuit or processor that calculates a location based on the location determination measurements provided by the receiver 214. For example, in the case of GPS signals, the location engine 210 may perform time difference of arrival calculations, while in the case of distance measurements from WiFi APs, the location engine 210 may perform triangulation calculations. In some embodiments, the location engine 210 may calculate the position with the aid of network assistance.

The SLP 212 provides a trusted execution environment (TEE) 208 within which the location engine 210 and/or receiver 214 may operate. Additionally, the TEE 208 may handle encryption, decryption and authentication operations. The TEE 208 provides security and isolation from other host entities that are outside the TEE, such as, for example, the OS and non-trusted applications. The isolation may prevent external entities from exercising control over SLP 212 processing modules or obtaining access to data stored in the SLP 212. In some embodiments, the TEE 208 may comprise separate physical hardware, for example an integrated circuit (IC) that is separate from an IC associated with the host 104. In some embodiments, the TEE 208 may comprise a separate controller or processor within an IC that is shared with the host 104. In some embodiments, the TEE 208 may comprise a separate domain within a controller or processor that is shared with the host 104. Various techniques may be employed to securely isolate the TEE 208 including situations where hardware is being shared between the TEE 208 and the host 104. These techniques may include privileged execution modes associated with the processor and access protection mechanisms associated with memory.

In operation, a trusted server 102 and/or a trusted application 206 may prove that it has rights to the secured location services provided by the SLP 212 by exchanging security information such as security keys or other credentialing information, which are known only to the trusted entity 102, 206 and the SLP 212. The keys may be exchanged using a secure socket layer protocol (SSL), Secure User Plane protocol (SUPL) or other suitable protocol including certificate based protocols. In some embodiments, the level of security that is required may be defined by the location service request. For example, a less stringent authentication may be permitted for a request associated with a reduced level of accuracy. These rights described above may include various characteristics associated with the location information such as, for example, a level of accuracy (sometimes also referred to as a quality of service), an expiration time for the access rights and any other characteristics that are suitable for regulation and/or restriction. The trusted entities 102, 206 may then request secure location information from the SLP 212 which may be encrypted by the SLP 212 and decrypted by the trusted entities 102, 206 based on the security keys.

In some embodiments, the secure location information provided by the SLP 212 may be the underlying location determination measurements, in which case the trusted entities 102, 206 may later calculate the location based on these provided measurements. In some embodiments, the secure location information provided by the SLP 212 may be the actual location calculated by the location engine 210, based on the location determination measurements. In either case the, the location or the location determination measurements may degraded in accuracy based on the particular rights possessed by the trusted entities 102, 206.

In some embodiments, the SLP 212 may verify that the location determination measurements have been updated within a recent time period, i.e., that they have not expired. The time period for expiration may be a pre-defined or programmable value. If the location determination measurements have expired, the SLP 212 may not transmit the information or may transmit some indication that the location is not authentic since the location may no longer be valid. Alternatively, for an expired measurement, the SLP 212 may transmit a blurred location which provides only a rough estimate of the unauthenticated location such as, for example, city level or state level positions.

Since the location information is secured or encrypted within the TEE 208 of the SLP 212, non-trusted or malicious applications or OS services on the host 104 may be prevented from accessing or modifying the information prior to or during transmission to the intended recipient trusted entities 102, 206.

Figure 3:
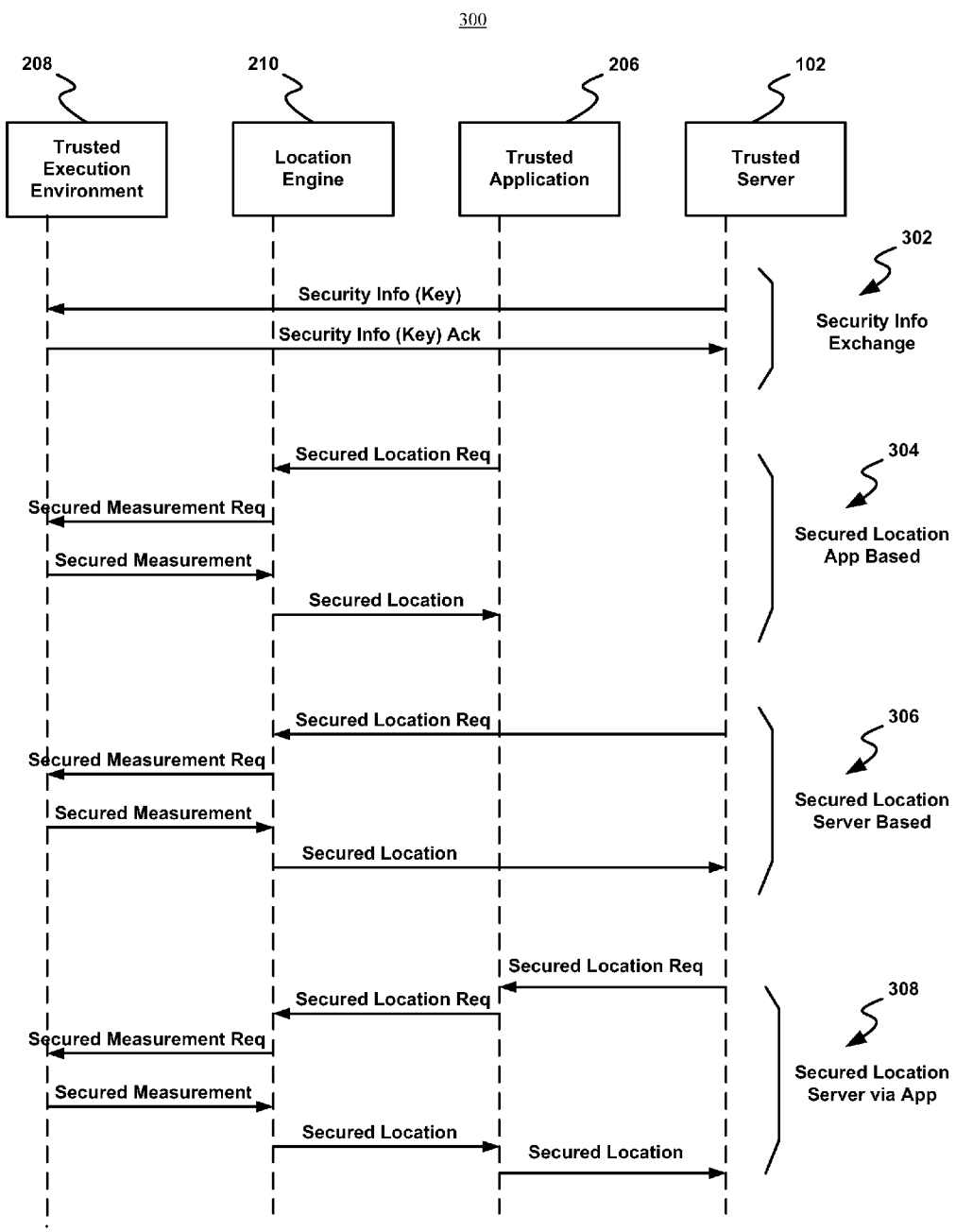
FIG. 3 illustrates block diagram of another exemplary embodiment consistent with the present disclosure.

FIG. 3 illustrates block diagram 300 of another exemplary embodiment consistent with the present disclosure. A number of possible data flow examples are shown between TEE 208, location engine 210, trusted application 206 and trusted server 102. In the first example 302, security information, for example a key, is exchanged between trusted server 102 and the TEE 208. The second example 304 illustrates an application based scenario where the trusted application 206 sends a secured location request to the location engine 210 which sends a secured measurement request to the TEE 208. The TEE 208 responds with a secured measurement and the location engine 210 calculates the secured location and transmits it to the trusted application 206. The third example 306 illustrates a server based scenario where the trusted server 102 sends a secured location request to the location engine 210 which sends a secured measurement request to the TEE 208. The TEE 208 responds with a secured measurement and the location engine 210 calculates the secured location and transmits it to the trusted server 102. The fourth example 308 illustrates a combination server/application based scenario where the trusted server 102 sends a secured location request to the trusted application 206 which then forwards the request to the location engine 210 which sends a secured measurement request to the TEE 208. The TEE 208 responds with a secured measurement and the location engine 210 calculates the secured location and transmits it to the trusted application 206 and then on to the trusted server 102.

Figure 4:
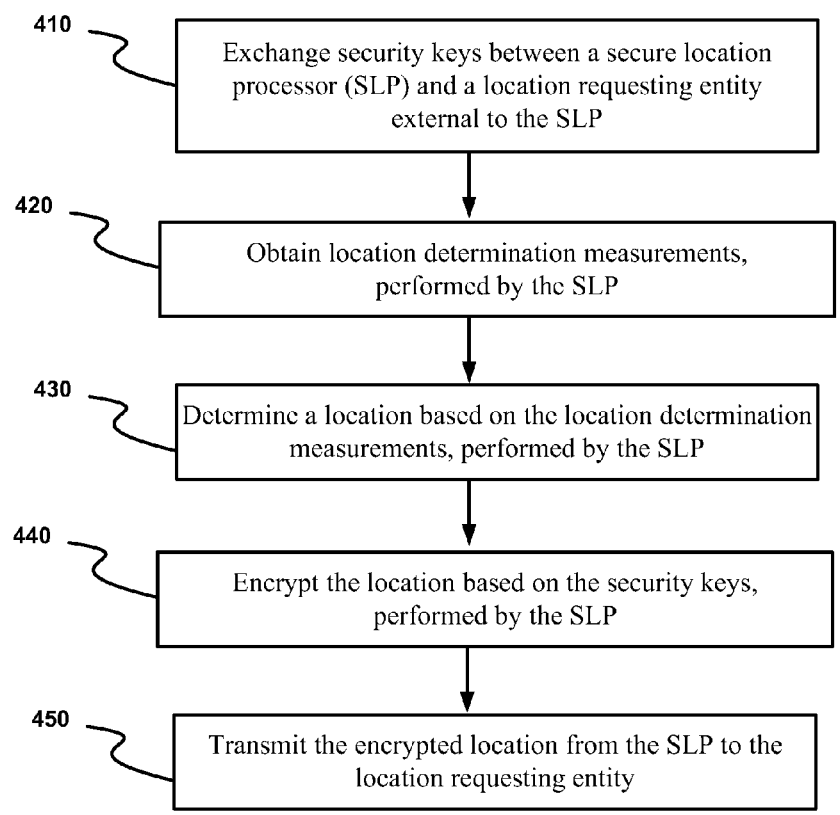
FIG. 4 illustrates a flowchart of operations of an exemplary embodiment consistent with the present disclosure.

FIG. 4 illustrates a flowchart of operations 400 of an exemplary embodiment consistent with the present disclosure. At operation 410, security keys are exchanged between a secure location processor (SLP) and a location requesting entity external to the SLP. The security keys may be used for encryption, such as, for example encryption based on public keys and private keys. In some embodiments, the location requesting entity may be a trusted application or a trusted server, either local or remote. At operation 420, location determination measurements are obtained within the SLP. In some embodiments, location determination measurements may include timing information, such as may be provided by a GPS receiver. In some embodiments, location determination measurements may include information provided by a WiFi station. At operation 430, a location is determined, within the SLP, based on the location determination measurements. At operation 440, the location is encrypted within the SLP based on the security keys. At operation 450, the encrypted location is transmitted from the SLP to the location requesting entity.

Figure 5:
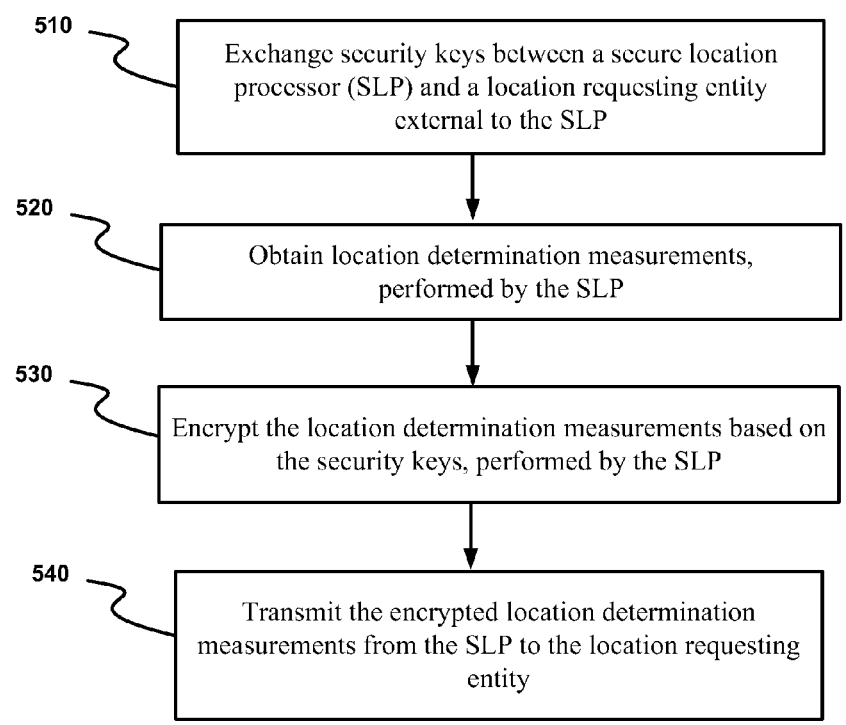
FIG. 5 illustrates a flowchart of operations of another exemplary embodiment consistent with the present disclosure.

FIG. 5 illustrates a flowchart of operations 500 of an exemplary embodiment consistent with the present disclosure. At operation 510, security keys are exchanged between a secure location processor (SLP) and a location requesting entity external to the SLP. The security keys may be used for encryption, such as, for example encryption based on public keys and private keys. In some embodiments, the location requesting entity may be a trusted application or a trusted server, either local or remote. At operation 520, location determination measurements are obtained within the SLP. In some embodiments, location determination measurements may include timing information, such as may be provided by a GPS receiver. In some embodiments, location determination measurements may include information provided by a WiFi station. At operation 530, the location determination measurements are encrypted within the SLP based on the security keys. At operation 540, the encrypted location determination measurements are transmitted from the SLP to the location requesting entity.

Figure 6:
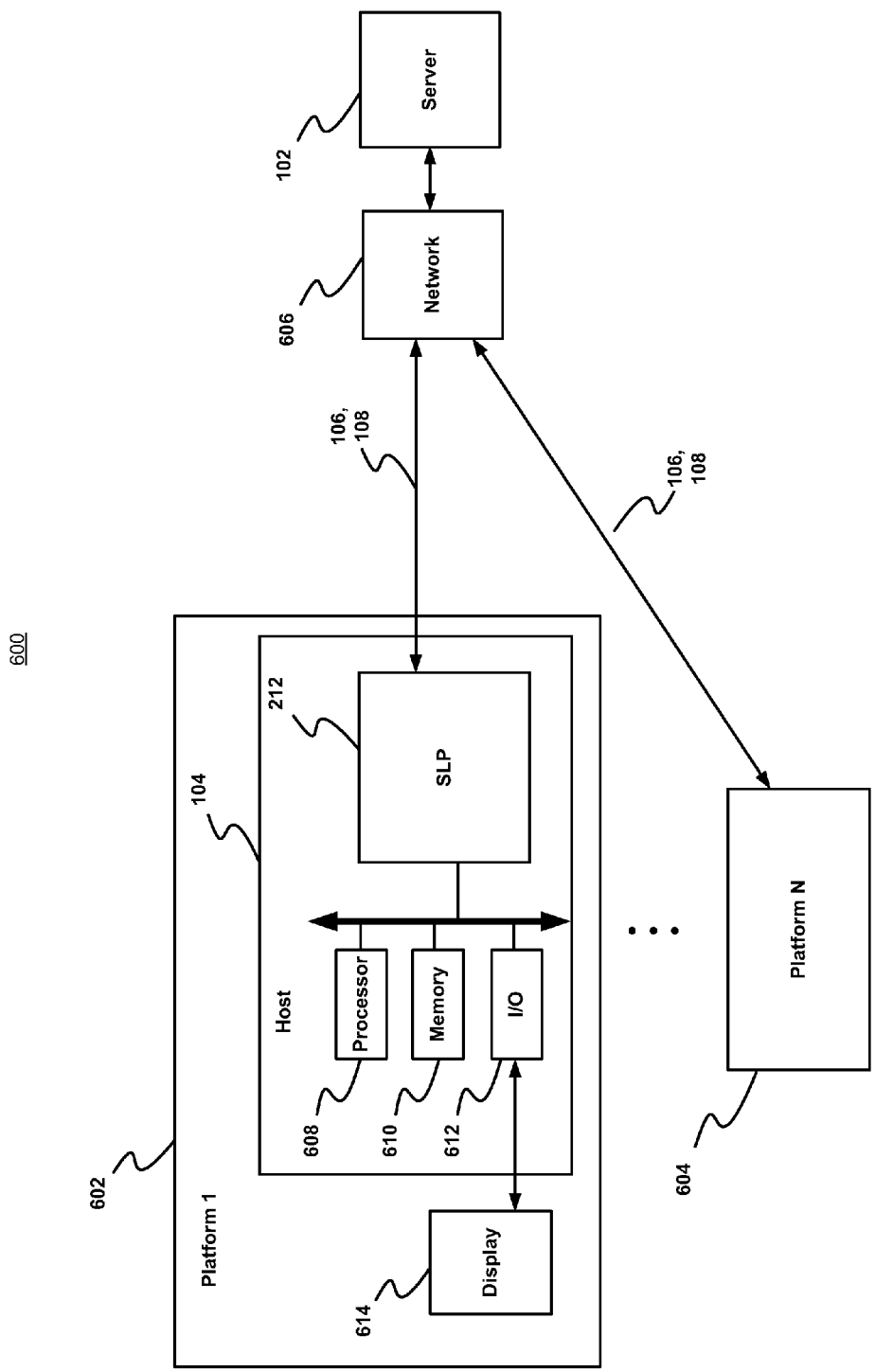
FIG. 6 illustrates a system diagram showing platforms consistent with an exemplary embodiment of the present disclosure in a network.

FIG. 6 illustrates a system diagram 600 showing mobile platforms with secure location capability in a network consistent with an exemplary embodiment of the present disclosure. A mobile platform 602, 604 may be a mobile communication device with location determination capabilities, such as, for example, a smartphone, a tablet, a laptop computing device or any other device configured to transmit or receive wireless signals. In some embodiments, platforms 602, 604 may comprise a host 104 including processor 608, memory 610 and input/output (I/O) system 612. Platforms 602, 604 may also comprise an SLP 212 as described above, which provides a TEE that is securely isolated from other components of the host 104 in order to generate secure and authenticated location information. Platforms 602, 604 may also comprise a display 614 or other type of user interface (UI) such as, for example, a touchscreen. Any number of platforms 602, 604 may transmit or receive request and response signals 106, 108 over a network 606 to a server 102.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a method and device for providing secure location information. According to one aspect there is provided a method. The method may include receiving, by a secure location processor (SLP), security key exchange information from a location requesting entity, the location requesting entity external to the SLP. The method of this example may also include obtaining location determination measurements, the obtaining performed by the SLP. The method of this example may further include determining a location based on the location determination measurements, the determining performed by the SLP. The method of this example may further include encrypting the location based on the security keys, the encrypting performed by the SLP. The method of this example may further include transmitting the encrypted location from the SLP to the location requesting entity.

Another example method includes the forgoing operations and the SLP provides a trusted execution environment (TEE) including a processor and memory, and the TEE restricts access to control and data within the SLP from entities external to the SLP.

Another example method includes the forgoing operations and the encryption provides security of the location and authenticity of the location.

Another example method includes the forgoing operations and the location determination measurements are obtained from a global positioning system (GPS) receiver, a wireless fidelity (WiFi) access point, and/or wireless sensors.

Another example method includes the forgoing operations and further includes providing an application programming interface (API) between the SLP and the location requesting entity, and the API provides standardized request and response message formats.

Another example method includes the forgoing operations and the location requesting entity is a trusted application or a trusted server.

Another example method includes the forgoing operations and further includes verifying that the location determination measurements have not exceeded an expiration threshold, the verifying performed by the SLP.

Another example method includes the forgoing operations and further includes adjusting the accuracy of the transmitted location based on credentials of the location requesting entity.

According to another aspect there is provided a method. The method may include receiving, by a secure location processor (SLP), security key exchange information from a location requesting entity, the location requesting entity external to the SLP. The method of this example may also include obtaining location determination measurements, the obtaining performed by the SLP. The method of this example may further include encrypting the location determination measurements based on the security keys, the encrypting performed by the SLP. The method of this example may further include transmitting the encrypted location determination measurements from the SLP to the location requesting entity.

Another example method includes the forgoing operations and the SLP provides a trusted execution environment (TEE) including a processor and memory, and the TEE restricts access to control and data within the SLP from entities external to the SLP.

Another example method includes the forgoing operations and the encryption provides security of the location determination measurements and authenticity of the location determination measurements.

Another example method includes the forgoing operations and the location determination measurements are obtained from a global positioning system (GPS) receiver, a wireless fidelity (WiFi) access point, and/or wireless sensors.

Another example method includes the forgoing operations and further includes providing an application programming interface (API) between the SLP and the location requesting entity, and the API provides standardized request and response message formats.

Another example method includes the forgoing operations and the location requesting entity is a trusted application or a trusted server.

Another example method includes the forgoing operations and further includes verifying that the location determination measurements have not exceeded an expiration threshold, the verifying performed by the SLP.

Another example method includes the forgoing operations and further includes adjusting the accuracy of the transmitted location determination measurements based on credentials of the location requesting entity.

According to another aspect there is provided a mobile platform with secure location capability. The platform may include a host including a processor and a memory, the host configured to run an operating system and one or more applications. The platform of this example may also include a secure location processor (SLP) coupled to the host through an application programming interface (API). The SLP of this example may include a receiver configured to provide location measurement data. The SLP of this example may also include a location engine coupled to the receiver, the location engine configured to generate a location based on the location measurement data. The SLP of this example may further include a trusted execution environment (TEE) configured to restrict access to control and data within the SLP from the host and the operating system and the applications, the TEE further configured to encrypt the location measurement data and encrypt the location for transmission to a location requesting entity external to the SLP.

Another example platform includes the forgoing components and the platform is further configured to receive, by the secure location processor (SLP), security key exchange information from the location requesting entity, the location requesting entity external to the SLP, and the encryption is based on the security keys.

Another example platform includes the forgoing components and the restricted access includes memory protection mechanisms, processor privileged mode execution mechanisms, and/or physical separation of hardware.

Another example platform includes the forgoing components and the receiver includes a global positioning system (GPS) receiver, a wireless fidelity (WiFi) receiver, and/or wireless sensors.

Another example platform includes the forgoing components and the API provides standardized request and response message formats.

Another example platform includes the forgoing components and the encryption provides security of the location and authenticity of the location.

Another example platform includes the forgoing components and the location requesting entity is a trusted application or a trusted server.

According to another aspect there is provided at least one computer-readable storage medium having instructions stored thereon which when executed by a processor, cause the processor to perform the operations of the methods as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for providing secure location information, said method comprising:
   receiving, by a secure location processor (SLP), security key exchange information including security keys from a location requesting entity, said location requesting entity external to said SLP;
   obtaining location determination measurements, said obtaining performed by said SLP;
   verifying that said location determination measurements have not exceeded an expiration threshold, said verifying performed by said SLP;
   determining location information based on said location determination measurements, said determining performed by said SLP;
   encrypting said location information based on said security keys, said encrypting performed by said SLP;
   transmitting said encrypted location information from said SLP to said location requesting entity;
   adjusting the accuracy of said location determination measurements based on credentials of said location requesting entity, said adjusting performed by said SLP;
   encrypting said adjusted location determination measurements based on said security keys, said encrypting performed by said SLP; and
   transmitting said encrypted location determination measurements from said SLP to said location requesting entity.

2. The method of claim 1, wherein said SLP provides a trusted execution environment (TEE) comprising a processor and memory, and said TEE restricts access to control and data within said SLP from entities external to said SLP.

3. The method of claim 1, wherein said encryption provides security of said location information and authenticity of said location information.

4. The method of claim 1, wherein said location determination measurements are obtained from a sensor selected from the group consisting of a global positioning system (GPS) receiver, a wireless fidelity (WiFi) access point, and a wireless sensor.

5. The method of claim 1, further comprising providing an application programming interface (API) between said SLP and said location requesting entity, wherein said API provides standardized request and response message formats.

6. The method of claim 1, wherein said location requesting entity is selected from the group consisting of a trusted application and a trusted server.

7. The method of claim 1, further comprising adjusting the accuracy of said transmitted location information based on credentials of said location requesting entity.

8. The method of claim 1, wherein said encryption provides security of said location determination measurements and authenticity of said location determination measurements.

9. A mobile platform with secure location capability, said platform comprising:
   a host comprising a processor and a memory, said host configured to run an operating system and one or more applications;
   a secure location processor (SLP) coupled to said host through an application programming interface (API)

and configured to at least receive security key exchange information including security keys from a location requesting entity external to said SLP, said SLP comprising:

a receiver configured to provide location measurement data;

a location engine coupled to said receiver, said location engine configured to generate location information based on said location measurement data; and a trusted execution environment (TEE) configured to:
restrict access to control and data within said SLP from said host and said operating system and said applications;
verify that said location measurement data has not exceeded an expiration threshold;
adjust the accuracy of said location measurement data based on credentials of said location requesting entity; and
encrypt said adjusted location measurement data and encrypt said location information for transmission to said location requesting entity.

10. The platform of claim 9, wherein said encryption is based on said security keys.

11. The platform of claim 9, wherein said restricted access comprises memory protection mechanisms and processor privileged mode execution mechanisms.

12. The platform of claim 9, wherein said restricted access comprises physical separation of hardware.

13. The platform of claim 9, wherein said receiver selected from the group consisting of a global positioning system (GPS) receiver, a wireless fidelity (WiFi) receiver, and a wireless sensor.

14. The platform of claim 9, wherein said API provides standardized request and response message formats.

15. The platform of claim 9, wherein said encryption provides security of said location information and authenticity of said location information.

16. The platform of claim 9, wherein said location requesting entity is selected from the group consisting of a trusted application and a trusted server.

17. A non-transitory computer-readable storage medium having instructions stored thereon which when executed by a processor result in the following operations for securely providing context sensor data, said operations comprising:

receiving, by a secure location processor (SLP), security key exchange information including security keys from a location requesting entity, said location requesting entity external to said SLP;

obtaining location determination measurements, said obtaining performed by said SLP;

verifying that said location determination measurements have not exceeded an expiration threshold, said verifying performed by said SLP;

determining location information based on said location determination measurements, said determining performed by said SLP;

adjusting the accuracy of said location information based on credentials of said location requesting entity, said adjustment performed by said SLP;

encrypting said adjusted location information based on said security keys, said encrypting performed by said SLP; and transmitting said encrypted location information from said SLP to said location requesting entity.

18. The computer-readable storage medium of claim 17, wherein said SLP provides a trusted execution environment (TEE) comprising a processor and memory, and said TEE restricts access to control and data within said SLP from entities external to said SLP.

19. The computer-readable storage medium of claim 17, further comprising the operation of providing an application programming interface (API) between said SLP and said location requesting entity, wherein said API provides standardized request and response message formats.

* * * * *